United States Patent
Cornelissen et al.

(10) Patent No.: US 6,797,295 B2
(45) Date of Patent: Sep. 28, 2004

(54) SPRAYABLE BROWNING COMPOSITION

(75) Inventors: Johannes Mattheus Cornelissen, Crawley (GB); Peter van den Enden, Vlaardingen (NL); Cornelis Willem van Oosten, Vlaardingen (NL)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 258 days.

(21) Appl. No.: 09/884,392

(22) Filed: Jun. 19, 2001

(65) Prior Publication Data

US 2002/0031578 A1 Mar. 14, 2002

(30) Foreign Application Priority Data

Jun. 20, 2000 (EP) ............................................. 00305234

(51) Int. Cl.$^7$ ............................................. A23L 1/275
(52) U.S. Cl. .................. 426/115; 426/94; 426/241; 426/250; 426/305; 426/540; 426/658; 426/602; 426/466
(58) Field of Search .......................... 426/94, 241, 250, 426/305, 540, 658, 573, 602, 446, 115

(56) References Cited

U.S. PATENT DOCUMENTS

| | | | |
|---|---|---|---|
| 3,220,850 A | | 11/1965 | Kirk |
| 4,399,165 A | | 8/1983 | Tack et al. |
| 5,043,173 A | * | 8/1991 | Steinke et al. ................. 426/94 |
| 5,118,514 A | * | 6/1992 | Adams et al. ................. 426/94 |
| 5,393,542 A | | 2/1995 | Stradal et al. |
| 5,397,582 A | | 3/1995 | Underwood et al. |
| 5,738,891 A | * | 4/1998 | Andreae et al. ............. 426/113 |
| 5,891,490 A | * | 4/1999 | Merabet ...................... 426/302 |
| 6,090,421 A | * | 7/2000 | Christophersen et al. ... 426/115 |
| 6,261,612 B1 | * | 7/2001 | Ballard et al. ................. 426/94 |

FOREIGN PATENT DOCUMENTS

| | | |
|---|---|---|
| EP | 0 769 245 A1 | 4/1997 |
| EP | 0 919 136 | 6/1999 |
| JP | 08131092 | 5/1986 |
| WO | 91/14370 | 10/1991 |
| WO | 94/00996 | 1/1994 |
| WO | 94/13160 | 6/1994 |
| WO | 98/53712 | 12/1998 |

OTHER PUBLICATIONS

European Search Report dated Nov. 13, 2001.

* cited by examiner

*Primary Examiner*—N. Bhat
(74) *Attorney, Agent, or Firm*—Gerard J. McGowan, Jr.

(57) ABSTRACT

The present invention relates to a sprayable browning composition which, when applied to a foodstuff, imparts a browning and optionally also a flavoring effect to the surface of the substrate to which it is applied. This is achieved by an oil in water emulsion comprising a browning agent and emulsifier.

14 Claims, No Drawings

SPRAYABLE BROWNING COMPOSITION

FIELD OF THE INVENTION

The present invention relates to a browning composition which, when applied to a foodstuff, in particular french fries or a meat product, imparts a browning effect to the surface of the substrate to which it is applied. More in particular, the present invention relates to a low cost, reduced calorie browning composition which can be applied by spraying on a foodstuff, and which leads to browning of foodstuff within a short time.

BACKGROUND OF THE INVENTION

Sprayable, edible products for dispensing on food surfaces are well known in the art. These products are for example used to impart a brown appearance and crispy texture to foods cooked in an oven or a microwave or foodstuff subjected to a combination of both hot air and microwave energy sources.

WO 91/14379 discloses aqueous solutions comprising precipitated hydroxyacetaldehyde which are useful for browning foodstuffs. Addition of amino acids to this aqueous solution to produce a Maillard type flavour is also disclosed.

The browning compositions of WO 91/14379 are generally applied in the form of an aqueous solution. This makes them less suitable for carrying flavours. Upon heating a foodstuff which has been covered with the browning composition, the water will evaporate, thereby taking away some of the flavour in the water vapour phase, leading to flavour depletion. Furthermore water containing compositions do not contribute to a fatty surface on the foodstuff which is often desired. Again due to evaporation of the water a dry surface often results after cooking.

EP-A-919,136 discloses a sprayable emulsion for enhancing browning of foodstuffs, in particular meat or meat products, which emulsion comprises a fat or oil phase, in an amount of 85–97% by weight, a water phase, in an amount of 3–15% by weight, a browning agent, dissolved or dispersed (mainly) in the water phase.

According to EP-A-919,136 this composition can easily be sprayed onto foodstuffs such as harty snacks, meat, meat products etc. These products can as well be suitably used in shallow frying or baking. Food products treated with this composition are reported to be brown or gold brown after cooking.

However, the compositions according to EP-A-919,136, although imparting browning, are relatively high in fat content and hence have considerable caloric value. Moreover the high fat content makes these compositions relatively expensive.

Furthermore improvement of sprayability is desired.

It is an object of the current invention to provide a sprayable browning composition, which can be sprayed easily in the form of a finely divided spray without the need for a pressurized pumping mechanism, which composition is low price, reduced calorie, and a good carrier for flavour systems.

SUMMARY OF THE INVENTION

It has now been found that good results w.r.t. the above can be achieved by a sprayable emulsion for enhancing browning of foodstuffs, comprising an oil phase, a water phase and a browning agent, wherein the emulsion is an oil in water emulsion and the emulsion comprises a oil phase, in an amount of 5 to 80% by weight, a water phase, in an amount of 20 to 95% by weight, a browning agent, dissolved or dispersed in the water phase an emulsifier.

DETAILED DESCRIPTION OF THE INVENTION

The terms "oil" and "fat" are used interchangeably in this specification and claims.

It was found that the above formulation was both easy to apply using a simple spraying apparatus or an aerosol and also provided excellent browning results when applied to foodstuffs such as french fries, harty snacks, meat and meat products. These browning results were obtained even when the product was heated in a microwave, which usually does not lead to browning.

In particular when such products are prepared or heated in an apparatus providing both a hot air energy source and a microwave energy source in combination, browning was achieved within a short time period after the product was cooked, with a reduction of at least 10% in time, compared to the time required to achieve the same degree of browning in the same apparatus without the application of the current emulsion to the foodstuff.

Additionally, it was found that the emulsion as defined above could be sprayed (e.g. on the foodstuff) using low pressure standard equipment only. Hence, by using the emulsion according to the invention the use of complicated, expensive high pressure professional spraying equipment can be dispensed with. Also, since the formulations according to the invention are sprayable, this opens the possibility for easy application in a convenient, hygienic way, without the need for application by brushing, dipping etcetera, which is in particular advantageous from a hygienic point of view.

Furthermore the present emulsion comprises 5 to 80 wt % of an oil or fat and therefore can be prepared relatively cheap.

In the present invention, it is preferred that the water phase is present in the emulsion in an amount of 55 to 70% by weight.

The water phase is defined as the total of all ingredients which are either water dispersible or water soluble and which in a common process of preparation of the emulsion, are mixed with the water before the water phase is mixed with the fat phase. Components of the water phase therefore include water, salt, gums such as xanthan gum, preservatives or acid regulators such as lactic acid and potassium sorbate, colourants such as beta-carotene, vitamins, flavour components and the browning agent.

The oil phase is defined as the total of all ingredients which are either oil dispersible or oil soluble and which in a common process of preparation, are mixed with the oil component before the water phase is mixed with the oil phase. Components of the oil phase therefore include (vegetable) oil, oil soluble emulsifier such as citric acid esters of mono or di-glycerides, oil soluble flavours.

In this invention the browning agents as such are known in the art, e.g. from U.S. Pat. No. 5,397,582 and U.S. Pat. No. 5,393,542. They generally contain a mixture of carbohydrates which may have been treated by heating, pyrolysation, burning, etcetera. The preferred browning agent comprises at least some hydroxyacetaldehyde and most preferred the browning agent is hydroxyacetaldehyde.

In general, all or most of the browning agent will be dissolved in the water present in the emulsion, however, given the fact that these browning compositions may contain some matter which is difficult to dissolve, some of the browning agent may be present dispersed in the water phase. Nevertheless, it is preferred if the browning agent is chosen such that it is essentially dissolved in the water phase. The amount of browning agent needed in the emulsion according to the invention depends on the nature of the browning agent, the foodstuff to which it is applied, and the desired result. In most cases, the amount of browning agent is from 0.1 to 5 % by weight, based on the total composition, preferably 1–3%.

The emulsion comprises an emulsifier to ensure the formation of a homogeneous oil in water emulsion wherein the oil phase is stably dispersed in the water phase.

Any emulsifier which is known to promote the formation of an oil in water emulsion can be applied for the purpose of the invention.

In a preferred embodiment of the invention, the emulsifier is selected from the group comprising polyglycerol fatty acid esters, monoacylglycerols, galactolipids, diacylglycerols and esters of any of these with acids such as fatty acids; and polyoxyethyleen compositions such as sorbitan mono polyoxyethyleen (Tween).

According to an even more preferred embodiment, the emulsifier is a fat soluble citric acid ester of mono- or diglycerides such as Citrem LR10™ which can be obtained from Danisco.

It will be appreciated that the specific amount of emulsifier that is required to provide a stable oil in water emulsion which does not separate in an oil phase and an aqueous phase upon storage, depends on the type of emulsifier and the ratio of aqueous phase to fat phase. However it was found that in general it is preferred that the emulsifier is present in an amount of from 0.01 to 5 wt %, more preferred 0.05 to 0.5 wt % on total product.

As indicated above the emulsion according to the present invention is a particularly good carrier for flavour compositions. These flavour compositions are preferably essentially present in the dispersed oil phase. Upon heating the emulsion which has been applied on food stuff, will decompose due to evaporation of water and the flavour components will be released from the oil phase.

Preferred flavour compositions are fat soluble savoury flavour compositions such as those selected from the group comprising Curry spice mix, Ham flavour, Bacon flavour, TIKKA™, CAJUN™, INDIAN SPICE MIX™ ex Givaudan.

The browning agent preferably is a carbohydrate which has been subjected to heating, pyrolising or a similar treatment. The thus resulting composition usually comprises ingredients which may react in a Maillard type reaction with amino acid residues of proteins. It is highly preferred that this Maillard reaction only takes place after the emulsion has been applied onto the foodstuff that is to be cooked at increased temperature.

To prevent a premature reaction in the packed emulsion, the amount of proteinaceous material and of compounds with primary or secondary amino groups, if present at all, should be low, e.g. the amounts of these materials should be below 1 wt. %, or preferably below 0.5 wt. %, more preferably below 0.2 wt. % based on total weight of the emulsion. An example of a substance which contains protein is egg yolk, which is preferably absent or present in an amount below 10 wt. %, preferably below 8 wt %, more preferably below 5 wt. % based on total weight of the emulsion.

More preferably, to prevent a premature reaction in the packed emulsion, the emulsion is essentially free of proteinaceous material and essentially free of compounds with primary or secondary amino groups such as in lecithin. These compounds could undergo a Maillard type reaction with the browning agent and thereby decrease it's effective amount in the emulsion. This risk is especially present when the emulsion is distributed at temperatures above refrigeration temperature.

Proteinaceous material includes buttermilk powder, skim milk (powder), casein, whey protein, soy protein, egg yolk and the like.

The oil phase may comprise any suitable fat and is preferably composed of mainly triglycerides which are pourable at room temperature. Suitable fats include sunflower oil, soy bean oil, olive oil, palm oil and the like.

The amount of fat phase is preferably from 30 to 45% by weight.

Although fat/oil, water and the browning agent are the major constituents (in terms of function), other components may be present as well. In this respect, it is preferred to include in the formulations according to the invention a thickener or a gelling agent. Examples of these are gums like xanthan gum, gum arabic, guar gum, starch, modified starch and starch-like matter. Such components may contribute to wettability, color, flavour and crust formation.

If a starch is added, a pregelatinised starch such as Maizena is preferred. Ungelatinised starches are usually less suitable because they may cause clogging of the nozzle in a spraying means.

For such purposes, the amount of gelling agent or thickener generally ranges from 0.05 to 6 wt % on total product weight. For this purpose the amount of gum added preferably ranges from 0.1 to 0.4 wt % and the amount of (modified) starch to be used preferably ranges from 0.5–5%, preferably from 1–3% by weight, based on the total composition.

Other components that may be present are food grade salt, herbs, spices, colorants, etcetera.

Suitable salts include sodium chloride (cooking salt), calcium chloride.

The presence of a salt in an amount of from 0.1 to 10 wt % is preferred, especially in view of the positive combined effect on taste and flavour when salt is present in the aqueous phase and a flavour component is present in the fat phase.

An acid component may be incorporated into the water phase in order to lower the pH of the water phase in such an extent that microbiological spoilage is prevented or reduced. Lactic and citric acid are preferred in this respect.

As the emulsions according to the invention are sprayable from simple spraying equipment, the invention also extends to such equipment containing the emulsions according to the invention. Such containers (bottles, cans, packs, etcetera) generally comprise dispersing means, pressurizing means and the emulsion according to the invention. As the compositions according to the invention are preferably sprayed on the foodstuff, the dispersing means will generally comprise a nozzle. In order to push the emulsion out of the container (through the nozzle) some sort of pressurizing means may be needed. As the emulsion is well sprayable using simple equipment, said pressurizing means may be provided by a hand-operated pump or pressurized gas. In the latter case, the emulsion may be contained in a pressurized can.

The invention further extends to the use (by applying it to the foodstuff) of the compositions according to the invention for imparting a brown or golden brown color to foodstuffs, by spraying said emulsion to the foodstuffs prior to a heating step.

The invention also extends to the use (by applying it to the foodstuff) of the compositions according to the invention for imparting a flavour to foodstuffs, by spraying said emulsion to the foodstuffs prior to a heating step.

The invention is in particular suitable in use of the emulsion for imparting a brown or golden-brown color to foodstuffs whereby the heating of said foodstuff is carried out in an apparatus providing both a hot air energy source and a microwave energy source.

The emulsion can be prepared by any suitable method to prepare emulsions of an aqueous phase and a fat phase. In a preferred process, the water phase including all ingredients is prepared at a temperature above 40° C. and subsequently mixed with the fat phase at a temperature above 20° C. In a further step a fine emulsion is prepared by submitting the combined water and fat phase to a treatment in a colloid mill or apparatus with a similar functionality.

The product is optionally subjected to a pasteurisation or sterilisation treatment either after the emulsion is prepared or separately for the aqueous phase before the emulsion is prepared.

The invention is further exemplified by the following examples, which are to be understood as to be non-limiting.

EXAMPLES

A water phase and an oil phase were prepared with the following compositions (percentages by weight, based on the total composition)

| Water phase | |
|---|---|
| Water | 50.91 |
| Cooking salt (NaCl) | 6 |
| Smokez MB12 (dry) | 2.5 |
| Xanthan gum | 0.34 |
| lactic acid | 0.1 |
| Potassium sorbate | 0.1 |
| Beta-carotene solution, 1% | 0.05 |
| Final pH | 4.25 |
| Oil phase | |
| Sunflower oil | 38.77 |
| Citrem LR10 ex Danisco, Denmark | 0.23 |
| Oil soluble flavour | 1 |

The water phase was prepared by heating water to 100° C., adding the water phase ingredients as indicated above, stirring in an Ultraturrax at about 3000 rpm for some minutes, adding lactic acid (in the form of a 10% solution in water).

The fat phase was prepared at room temperature (25° C.).

The fat phase was added to the water phase under slow stirring within a time span of about 20 minutes. During adding the mixture was not heated anymore. The mixed phases were subjected to a colloid mill treatment (PrestoMill™, split width setting 2, stirring viscosity setting 7) and were subsequently filled into spraying bottles.

The emulsion was easy to spray using a hand-operated pump (according to the type used domestically for spraying plants), and when applied did impart a very good browning and flavour effect to french fries upon cooking.

After heating in a Turbo Chef oven which provides in combination a hot air energy source and a microwave energy source, the french fries spread a pleasant flavour of deep fried french fries.

What is claimed is:

1. Sprayable emulsion for enhancing browning of foodstuffs, comprising an oil phase, a water phase and a browning agent, characterised in that the emulsion is an oil in water emulsion and the emulsion comprises an oil phase, in an amount of 30 to 45% by weight, a water phase, in an amount of 55 to 70% by weight, a browning agent, dissolved or dispersed in the water phase an emulsifier.

2. Emulsion according to claim 1 wherein the browning agent comprises hydroxyacetaldehyde.

3. Emulsion according to claim 1 wherein the emulsifier is a fat soluble citric acid ester of mono- or diglycerides.

4. Emulsion according to claim 1, wherein the browning agent is dissolved in the water phase.

5. Emulsion according to claim 1, wherein the browning agent is present in an amount of from 0.1–5% by weight, based on the total composition.

6. The emulsion according to claim 5 wherein the browning agent is present in an amount of from 1–3% by weight.

7. Emulsion according to claim 1, wherein the composition further comprises a flavour composition which is essentially present in the oil phase.

8. Emulsion according to claim 7, wherein the flavour composition is selected from the group of fat soluble savoury flavours.

9. A method for imparting a flavour to foodstuffs, comprising spraying the emulsion according to claim 7 onto the foodstuffs prior to heating.

10. Emulsion according to claim 1 which is essentially free of proteinaceous material and essentially free of compounds with primary or secondary amino groups.

11. Container for holding a liquid, said container, comprising dispersing means, pressurizing means and an emulsion according to claim 1.

12. A process for imparting a brown or golden brown color to foodstuffs, comprising spraying the emulsion according to claim 1 onto the foodstuffs prior to heating.

13. A process according to claim 12, wherein the heating step is carried out in an apparatus providing both a hot air energy source and a microwave energy source.

14. Emulsion according to claim 1 which is essentially free of lecithin.

* * * * *